United States Patent Office 2,720,484
Patented Oct. 11, 1955

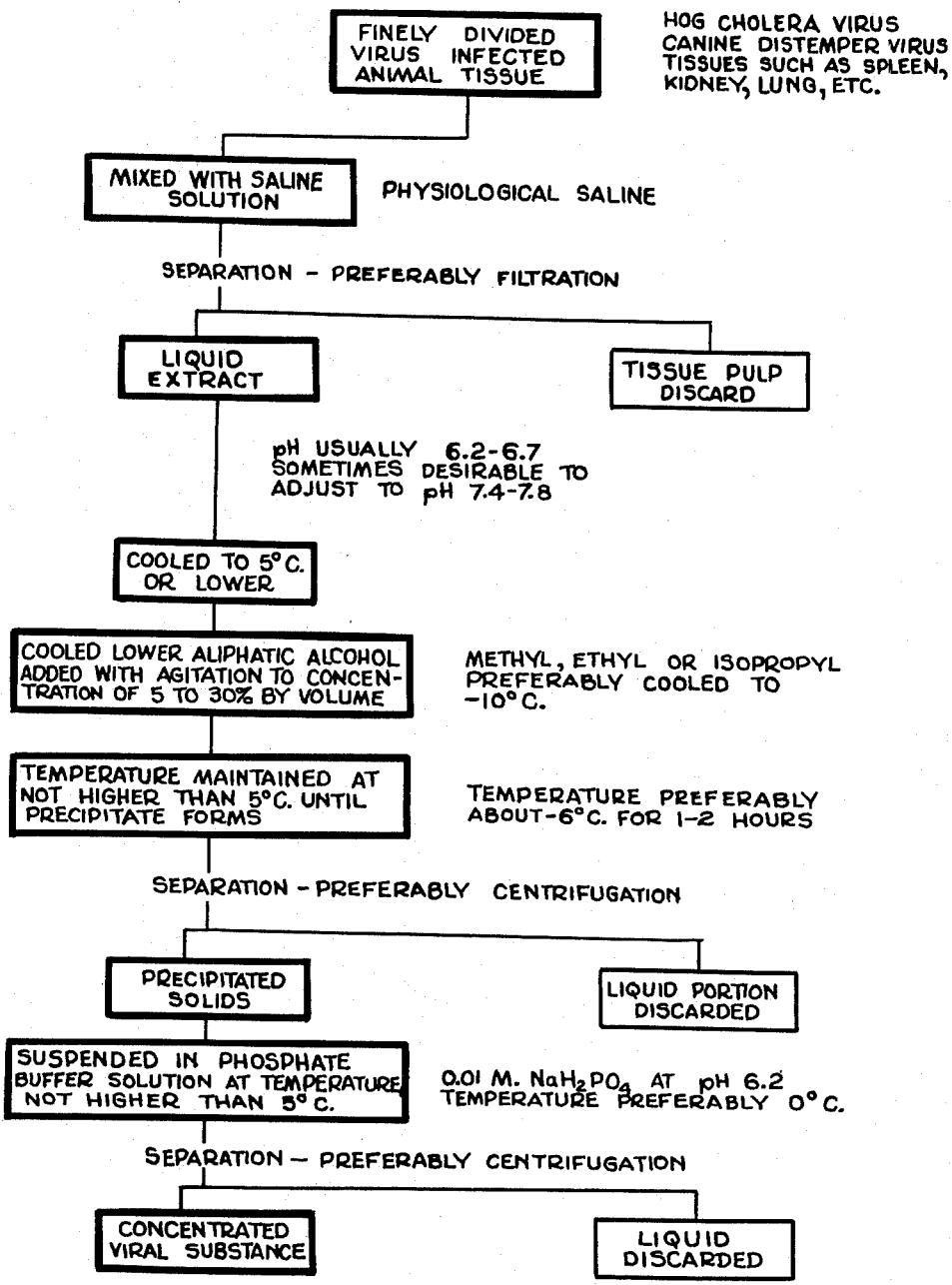

2,720,484

PROCESS FOR SEPARATION OF VIRAL SUBSTANCES FROM ANIMAL TISSUES

Carl M. Meadows, Indianapolis, Alfred H. Brueckner, Zionsville, and William S. Gochenour, Indianapolis, Ind., assignors to Allied Laboratories, Inc., Kansas City, Mo., a corporation of Delaware Application February 16, 1950, Serial No. 144,581

8 Claims. (Cl. 167—78)

This invention relates to a method for purifying and concentrating viral substances. More particularly, it relates to a process of separating, in a relatively concentrated and purified form, viral substances from animal tissues.

One of the most important methods for the control of virus diseases in animals is by vaccination. One vaccination process involves the simultaneous administration of a suspension of a viable virus containing tissue and an immune serum to stimulate the production of antibodies and resultant immunity. Another vaccination process involves the administration of a suspension of animal tissues containing killed and/or modified virus. In the later vaccination process, even though the virus may not be viable, it has the ability to stimulate antibodies and resultant immunity. In the immunizing process discussed above, it is noted that the viral substance is administered in the form of an aqueous suspension which also contains the animal tissue substances. The high animal tissue content of the vaccines has been considered undesirable, but no entirely satisfactory method has been devised for eliminating them. Likewise, no satisfactory commercial method has been devised for concentrating and/or purifying viral substances such as those causing hog cholera and canine distemper. It has been assumed that the viral substances were so intimately associated with the animal tissue substances that any attempted methods for concentrating and/or purifying them would result in loss of most of the activity. The present process is therefore, a definite advance in the art, and the results obtained were not the expected ones.

In many of the more widely spread virus diseases, the virus invades substantially all of the tissues of the animal carcass. For example, in hog cholera and canine distemper, the virus is associated with substantially all tissues of the animal carcass. The amount of virus contained in the different types of tissue will, of course, vary considerably. Because of the variable amounts of virus contained in the tissue, only those tissues having relatively large virus concentrations have been generally used in the past for vaccine production. For example, in the production of chemically inactivated hog cholera tissue vaccines, only the spleen is generally used. The spleen or other internal organs which usually contain a high concentration of virus constitute only a small proportion of the entire animal carcass. In the past, therefore, most of the animal carcass has been discarded and constituted a heavy economic loss.

In spite of the fact that it has been known for a long time all of the animal carcass tissues of virus infected individuals contained appreciable concentrations of virus, no satisfactory method has been developed for removing and/or concentrating the virus from the individual tissues or the entire animal carcass tissue.

In accordance with the present invention, we have discovered a method for purifying and/or concentrating viral substances from infected animal tissue. It is an advantage of the present invention that by our process, viral substances can be recovered in a relatively pure and concentrated form from those animal tissues, such as the spleen, that are ordinarily used for vaccine production and which concentrates are suitable for the production of potent vaccines. It is also a distinct advantage of our invention that virus infected animal tissues that have heretofore been considered unsuitable for vaccine production can be rendered suitable by our process.

In general our invention can be practiced as follows: The virus containing tissues obtained from animals infected with a virus disease are ground or homogenized and mixed with an aqueous saline solution, preferably, we employ normal physiological saline solution or a buffered physiological saline solution. After thorough mixing, the fluids are separated from the tissue pulp, and the virus containing fluids used for further processing. In cases where the virus is stable at ordinary temperatures, the above extraction is carried out at room temperatures. In the case of a virus that is unstable at ordinary temperatures, the extraction may be carried out at lower temperatures.

The fluid extract containing the virus usually has a pH of from about 6.2–6.7 and can be used without further adjustment. On the other hand, we have found, in certain instances, that it is desirable to adjust the pH to from about 7.4–7.8. The extracted fluids are cooled to a temperature of about 5° C. or lower and a lower aliphatic alcohol such as methyl, ethyl, or isoproyl is added slowly with moderate and continuous agitation to a concentration of from about 5% up to about 30% by volume. The alcoholic solution is cooled prior to the mixing so that the temperature of the mixture is kept lower than 5° C. The mixture is maintained at a temperature lower than 5° C. (preferably about —6% C.) to allow the formation of a precipitate. The precipitate comprising a mixture of virus and animal proteins is collected by any suitable means, preferably by centrifugation. The collected precipitate is mixed with distilled water or 0.01 M $NaH_2PO_4$ solution at a temperature lower than 5° C., preferably 0° C., and stirred until a homogeneous suspension is obtained. This suspension is centrifuged while still being maintained at a temperature lower than 5° C., resulting in the collection of a virus containing precipitate from which a major proportion of the alcohol and a considerable amount of the inert material has been separated. This material comprises our concentrated viral substance and may be suspended in sufficient saline solution to effect any desired degree of concentration.

The following specific examples will serve to illustrate our invention in more detail:

EXAMPLE 1

*Concentration of hog cholera viral substance from spleen tissue*

995 gms. spleen tissue (from infected hogs sacrificed 7 days after inoculation with hog cholera virus) were ground by passing through a meat grinder two times, and 2000 cc. of physiological saline was added to the ground spleen tissue in a stainless steel container. 30 gms. filter paper scraps were added to the spleen-saline mixture, and this material was stirred for one hour (at room temperature) after which it was strained through several thicknesses of cheese cloth, and the remaining pulp was pressed for collection of additional fluid. Total fluids collected, 2500 cc.—pH 6.8. The collected fluid or "extract" was cooled to 0° C. and methyl alcohol cooled to —10° C. was slowly added with stirring. The volume of methyl alcohol added was 1070 cc. so that alcohol concentration was finally 30%. The alcohol-extract mixture was allowed to stand for one hour, and then centrifuged in an angle head centrifuge held at —6° C. The precipitate collected from the alcohol-extract mixture was resuspended in 0.01 M NaH₂PO₄ at pH 6.2, and again centrifuged at 0° C. and the collected precipitate suspended in sufficient saline to make 2900 cc. of suspension, a volume equivalent to about three times the weight of the original spleen tissue. The presence of hog cholera viral substance in the final suspension is demonstrated by inoculation tests on susceptible swine.

The following table contains the results of the titrations of hog cholera virus in the original spleen tissue suspension and in the purified suspension obtained after processing in accordance with the above procedure.

| Pig No. | Inoculum | Dilution | Dose, cc. | Date | Result |
|---|---|---|---|---|---|
| 4521 | Original tissue suspension (1-3 tissue dilution). | 1-30,000 | 1 | 3/11/49 | Survived. |
| 4519 | ----do---- | 1-15,000 | 1 | 3/11/49 | Died, cholera. |
| 4526 | Final purified suspension (3 times original tissue weight). | ¹ 1-22,500 | 1 | 3/11/49 | Do. |

¹ Highest dilution of concentrate tested.

The titration test shows that the original tissue titer is between 1-15,000 and 1-30,000. The purified virus containing precipitate brought back to same volume as original tissue-saline mixture has titer of at least 1-22,500. This indicates approximately complete recovery of virus from the original spleen tissue.

EXAMPLE 2

*Concentration of hog cholera viral substance from a mixture of tissues*

1760 gms. of a mixture of tissues obtained from infected hogs sacrificed 7 days after inoculation with hog cholera virus was processed under conditions similar to those specified in Example 1. The tissue mixture contained liver, kidney, spleen, and muscular tissues in the same proportions in which they occurred in the hog carcass. In this example, a good recovery of the viral substance was also obtained. The concentrate obtained in this example had a titer of least 1-100,000.

EXAMPLE 3

*Concentration of canine distemper viral substance*

1026 gms. of tissues (spleen, kidney, lungs, urinary bladder and gall bladder) from 7 dogs sacrificed on the 12th day after inoculation with canine distemper virus were ground in a homogenizing mill with four times their weight of normal saline (4,104 cc.) for 20 minutes. This mixture was centrifuged for 5 minutes at room temperature to remove larger particles. Total volme of extract was 4700 cc.—pH was 6.9. The extract was cooled to 0° C., and methyl alcohol at —10° C. was added slowly with stirring until 2014 cc. had been added. Final alcohol concentration was 30%. The alcohol-extract mixture was allowed to stand for one hour at —6° C., during which time a precipitate formed and this precipitate comprising the viral substance was then separated and collected by centrifugation at —6° C. The precipitate was resuspended in sufficient physiological saline to make a final volume of 3078 cc.

In this example, the virus was found to have been inactivated by the purification process, and it was necessary to prove its presence in the final suspension by an immunological test for inactive virus.

These tests are shown in the following table:

| Dog. No. | Litter No. | Vaccine | Dosage, cc. | No. Doses¹ | Exposure ² | Results (Observed 27 day after virus) |
|---|---|---|---|---|---|---|
| 9991 | 1 | Virus concentrate | 1 | 2 | 2 cc. virulent spleen virus. | Remained well throughout. |
| 9791 | 1 | ----do---- | 3 | 2 | ----do---- | Do. |
| 9793 | 1 | None | | | ----do---- | Died 18 days after virus of distemper. |
| 9794 | 2 | Virus concentrate | 1 | 2 | 2 cc. virulent spleen virus. | Died 15 days after virus of distemper. |
| 9995 | 2 | ----do---- | 3 | 2 | ----do---- | Remained well throughout. |
| 9797 | 2 | None | | | ----do---- | Died 14 days after virus of distemper. |
| 9798 | 3 | Virus concentrate | 1 | 2 | 2 cc. virulent spleen virus. | Remained well throughout. |
| 9993 | 3 | ----do---- | 3 | 2 | ----do---- | Do. |
| 9801 | 3 | None | | | ----do---- | Typical course of distemper. Recovered. |
| 9994 | 3 | ----do---- | | | ----do---- | Remained well throughout. |

¹ All vaccine does were by intradermal injections on October 21, 1948, and November 8, 1948.
² All exposures December 14, 1948. Controls and test dogs housed together.

The results set forth in the table show that 5 of the 6 susceptible dogs vaccinated with the concentrated viral suspension of the above example were effectively immunized against canine distemper. The one vaccinated animal which died received only 1 cc. doses of the purified concentrate and this was apparently too low a dose to immunize. The results, on the other hand, show that 3 of the 4 controls contracted distemper following the exposure. The tests prove, therefore, that the canine distemper viral substance was present in the purified concentrated suspension in an antigenic form.

Our invention has been specifically illustrated in connection with hog cholera and canine distemper virus. It is to be understood, however, that the invention is not limited to these two viral substances and can satisfactorily be applied to any viral substance associated with animal tissues. Among such additional viral substances are included rinderpest, foot and mouth disease, infectious canine hepatitis, equine encephalomyelitis, mink distemper, and other animal tissue invading virus.

Having thus described our invention, we claim:

1. A process of preparing a concentrated viral substance, comprising mixing finely divided virus infected animal tissue with a saline solution, separating a liquid extract from the tissue pulp, cooling the liquid extract to a temperature of not higher than 5° C. and adding with agitation a cooled lower aliphatic alcohol, until the alcoholic concentration is from about 5% up to about 30% by volume, adjusting the temperature of the mixture to not higher than 5° C., maintaining this temperature until a precipitate forms, collecting the precipitated solids, resuspending the precipitate in a phosphate buffer solution at not higher than 5° C. and recovering the concentrated virus containing precipitate.

2. A process of preparing a concentrated viral substance comprising, mixing finely divided virus infected animal tissue with a physiological saline solution, separating a liquid extract from the tissue pulp, cooling the liquid extract to a temperature of not higher than 5° C. and adding with agitation, a cooled lower aliphatic alcohol until the alcoholic concentration is from about 5% up to about 30% by volume, adjusting the temperature of the mixture to not higher than 5° C., maintaining this temperature until a precipitate forms, collecting the precipitated virus and animal proteins, resuspending the precipitate in 0.01 M $NaH_2PO_4$ at not higher than 5° C., centrifuging the mixture to obtain a concentrated virus containing precipitate.

3. A process of preparing a concentrated viral substance comprising, mixing finely divided virus infected animal tissue with a saline solution, separating a liquid extract from the tissue pulp, cooling the liquid extract to a temperature of not higher than 5° C. and adding with agitation cooled methyl alcohol, until the alcoholic concentration is from about 5% up to about 30% by volume, adjusting the temperature of the mixture to not higher than 5° C., maintaining this temperature until a precipitate forms, collecting the precipitated solids, resuspending the precipitate in a phosphate buffer solution at not higher than 5° C., and recovering the concentrated virus containing precipitate.

4. A process of preparing a concentrated viral substance comprising, mixing finely divided virus infected animal tissue with a physiological saline solution, separating a liquid extract from the tissue pulp, cooling the liquid extract to a temperature of not higher than 5° C., and adding with agitation cooled methyl alcohol until the alcoholic concentration is from about 5% up to 30% by volume, adjusting the temperature of the mixture to not higher than 5° C., maintaining this temperature until a precipitate forms, collecting the precipitated virus and animal proteins, resuspending the precipitate in 0.01 M $NaH_2PO_4$ at not higher than 5° C., centrifuging the mixture to obtain a concentrated virus containing precipitate.

5. A process of preparing a concentrated hog cholera viral substance comprising, mixing finely divided infective hog cholera tissue with a physiological saline solution, separating a liquid extract from the tissue pulp, cooling the liquid extract to a temperature of about 0° C. and adding with agitation methyl alcohol, cooled to about −10° C., until the alcoholic concentration is about 30% by volume, adjusting the temperature of the mixture to about −6° C., maintaining this temperature for about 1–2 hours, collecting the precipitated solids, resuspending the precipitate in a phosphate buffer solution at about 0° C., and recovering the concentrated hog cholera virus containing precipitate.

6. A process of preparing concentrated hog cholera viral substance comprising, mixing finely divided infective hog cholera spleen tissue with a physiological saline solution, separating a liquid extract from the tissue pulp, cooling the liquid extract to a temperature of about 0° C., and adding with agitation, methyl alcohol cooled to about −10° C., until the alcoholic concentration is about 30% by volume, adjusting the temperature of the mixture to about −6° C., maintaining this temperature for about 1–2 hours, collecting the precipitated solids, resuspending the precipitate in a phosphate buffer solution at about 0° C., and recovering the concentrated hog cholera virus containing precipitate.

7. A process of preparing a concentrated canine distemper viral substance comprising, mixing finely divided infective canine distemper tissue with a physiological saline solution, separating a liquid extract from the tissue pulp, cooling the liquid extract to a temperature of about 0° C. and adding with agitation methyl alcohol, cooled to about −10° C., until the alcoholic concentration is about 30% by volume, adjusting the temperature of the mixture to about −6° C., maintaining this temperature for about 1–2 hours, collecting the precipitated solids, resuspending the precipitate in a phosphate buffer solution at about 0° C., and recovering the concentrated canine distemper viral containing precipitate.

8. A process of preparing a concentrated canine distemper viral substance comprising, mixing finely divided infective canine distemper tissues comprising spleen, kidney, lung, urinary bladder and gall bladder tissues with a physiological saline solution, separating a liquid extract from the tissue pulp, cooling the liquid extract to a temperature of about 0° C. and adding with agitation methyl alcohol, cooled to about −10° C., until the alcoholic concentration is about 30% by volume, adjusting the temperature of the mixture to about −6° C., maintaining this temperature for about 1–2 hours, collecting the precipitated solids, resuspending the precipitate in a phosphate buffer solution at about 0° C., and recovering the concentrated canine distemper viral containing precipitate.

References Cited in the file of this patent

UNITED STATES PATENTS

| | | |
|---|---|---|
| 1,246,059 | Couret | Nov. 13, 1917 |
| 2,421,382 | Levinson | June 3, 1947 |
| 2,506,345 | Cox | May 2, 1950 |

OTHER REFERENCES

Pollard, in Proc. Soc. Exptl. Biol. & Med., vol. 71, June 1949, pp. 290–293.

Boyd, Fundamentals of Immunology, pp. 93 and 94, 2nd ed. (1947).